(12) United States Patent
Loving

(10) Patent No.: US 6,203,749 B1
(45) Date of Patent: Mar. 20, 2001

(54) PROCESS FOR FIBERGLASS MOLDING USING A VACUUM

(76) Inventor: David Loving, 7512 Point Aux Chenes Rd., Ocean Springs, MS (US) 39564

(*) Notice: Subject to any disclaimer, the term of this patent is extended or adjusted under 35 U.S.C. 154(b) by 0 days.

(21) Appl. No.: 09/338,164

(22) Filed: Jun. 22, 1999

Related U.S. Application Data (63) Continuation-in-part of application No. 08/734,586, filed on Oct. 22, 1996, now abandoned
(60) Provisional application No. 60/019,314, filed on Jun. 7, 1996, and provisional application No. 60/012,120, filed on Feb. 15, 1996.

(51) Int. Cl.⁷ ................................................. B29C 45/16
(52) U.S. Cl. ........................ 264/510; 264/258; 264/273
(58) Field of Search ................................ 264/134, 135, 264/136, 137, 510, 258, 259, 273, DIG. 78

(56) References Cited

U.S. PATENT DOCUMENTS

| | | | |
|---|---|---|---|
| 2,913,036 | * 11/1959 | Smith | 264/102 |
| 3,228,820 | * 1/1966 | Samson | 156/307.3 |
| 3,551,270 | * 12/1970 | Sharkey | 156/145 |
| 3,553,054 | * 1/1971 | Maus | 156/286 |
| 3,591,443 | * 7/1971 | Cox | 114/355 |
| 3,666,600 | * 5/1972 | Yoshino | 156/285 |
| 4,132,755 | * 1/1979 | Johnson | 264/553 |
| 4,560,523 | * 12/1985 | Plumley et al. | 264/102 |
| 4,622,091 | * 11/1986 | Letterman | 156/286 |
| 4,758,395 | * 7/1988 | Zion | 264/135 |
| 4,759,893 | * 7/1988 | Krauter | 264/258 |
| 4,942,013 | * 7/1990 | Palmer et al. | 264/511 |
| 5,009,687 | * 4/1991 | Kromrey | 65/18.1 |
| 5,052,906 | * 10/1991 | Seeman | 425/112 |
| 5,087,193 | * 2/1992 | Herbert, Jr. | 425/543 |
| 5,096,651 | * 3/1992 | Le Comte | 264/510 |
| 5,106,568 | * 4/1992 | Honka | 264/510 |
| 5,129,813 | * 7/1992 | Spheperd | 425/504 |
| 5,134,002 | * 7/1992 | Vallier | 428/36.2 |
| 5,152,949 | * 10/1992 | Leoni et al. | 264/257 |
| 5,242,651 | * 9/1993 | Brayden et al. | 264/510 |
| 5,242,652 | * 9/1993 | Savigny | 264/510 |
| 5,322,665 | * 6/1994 | Bernardon et al. | 264/571 |
| 5,344,601 | * 9/1994 | Newton | 264/255 |
| 5,403,537 | * 4/1995 | Seal et al. | 264/511 |
| 5,458,719 | * 10/1995 | Pall et al. | 156/285 |
| 5,576,030 | * 11/1996 | Hooper | 425/112 |
| 5,635,013 | * 6/1997 | Boi | 156/285 |
| 5,958,325 | * 9/1999 | Seeman, III et al. | 264/510 |

* cited by examiner

*Primary Examiner*—Jan H. Silbaugh
*Assistant Examiner*—Stefan Staicovici (57) ABSTRACT

A method of flowing resin from an inlet opening into a sealed mold and a lay up which is comprised of at least one top layer of absorbent or reinforcing material which defines a passage or hole from the inlet opening to a non-absorbent layer which non-absorbent layer lies above at least one bottom layer of reinforcing material. This process flows the resin from the inlet opening into the mold then through the passage defined by the top reinforcing layer through the non-absorbent layer and then through channels defined by the non-absorbent layer throughout the lay up. The most simple embodiment of the product embodying this is to have a substantially non-absorbent layer which defines in at least one channel for serving as a conduit for resin to move throughout the volume, a top layer of reinforcing material defining a non-absorbent passage from a resin inlet in the mold to the non-absorbent layer and a bottom layer of reinforcing material opposite the non-absorbent layer from the top layer of reinforcing material so that the non-absorbent layer is sandwiched between the top layer and the bottom layer so that resin can flow into and through the passage to the non-absorbent layer and then throughout the non-absorbent layer and back up into the top absorbent reinforcing layer and down into the bottom absorbing reinforcing layer.

19 Claims, 11 Drawing Sheets

PROCESS FOR FIBERGLASS MOLDING USING A VACUUM

This application is a continuation in part of U.S. application Ser. No. 08/734,586, filed Oct. 22, 1996, now abandoned, which claims the benefit of U.S. Provisional Applications Nos. 60/019,314, filed Jun. 7, 1996 and 60/012,120 filed Feb. 15, 1996.

FIELD OF THE INVENTION

The following specification relates to fiberglass molding processes. More particularly, the invention relates to vacuum assisted resin impregnation of fiber reinforced lay-ups in molds.

The most similar prior art is shown in U.S. Pat. No. 4,942,013 which teaches permeable cores used in fiberglass construction between sheets of fiberglass matting (see FIG. 10 of the '013 patent discussed below). The prior art shows the use of vacuum technology for vacuum impregnation of a fiber reinforcement such as carbon cloth with a resin to produce a resin-fiber composite. Some patents covering this technology and narrowing the specific search somewhat are:
   U.S. Pat. No. 4,902,215
   U.S. Pat. No. 5,052,906
   U.S. Pat. No. 5,316,462
   U.S. Pat. No. 4,942,013

The '013 patent is probably the closest art of this group.

The most important advance taught by the present specification improvement lies in running a channel through the fiber reinforcement cloth to the permeable core. Compare the language in the '013 patent:

"FIG. 10 is a prospective [sic] view of a foam core having slots in the surface thereof to function as resin flow paths for resin impregnation of fiber reinforcement skins to be positioned on the foam core . . . " P.6 lines 20–25.

"The provision of the resin flow channel formed by grooves 160 and 162 in the foam core 158 achieves large area, rapid impregnation of the cloth skins on both surfaces of the sandwich . . . " P.12 lines 35–45.

"A porous separator film 173 is located over the complete lay-up"

In this way the core, which is sandwiched in the middle of the cloth layers, serves as a conduit for the resin to move throughout the mold.

"How, in FIG. 10A does the resin get to the core to spread out throughout the mold?"

Claim 19 of the '013 patent addresses this as follows:

"Drawing of a vacuum to permit passage of the liquid resin through said resin inlet line, Flowing said resin through a path defined by said bleeder layer, Flowing said resin from said bleeder layer through and along said fiber reinforcement layer, and Flowing said liquid resin from said fiber reinforcement layer into said grooves (in the core) of said supporting block and from said grooves back into said fiber reinforcement layer."

The question is answered in our embodiment, by cutting a channel through the cloth to reach a flexible or non-flexible woven core.

GENERAL DESCRIPTION OF THE PREFERRED EMBODIMENT

The question of providing adequate impregnation of a mold without expensive materials or waste is answered in this proposed specification. The most immediate improvement is defined by cutting a channel through the cloth to reach a woven core.

Figure 1:
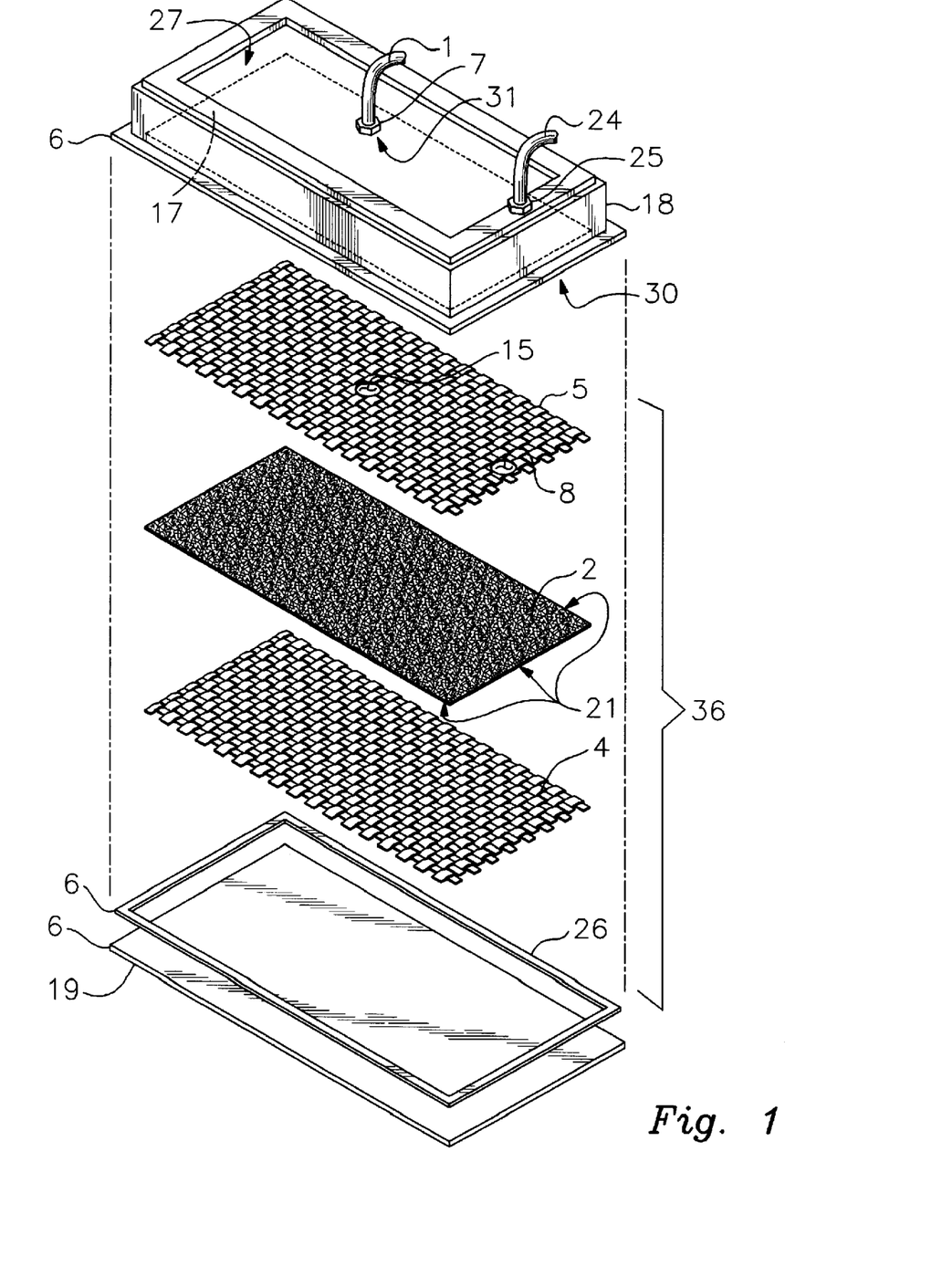
FIG. 1 shows an exploded plan view of a typical three layer lay-up using a two part mold utilizing the non-absorbent core using a knitted plastic material such as green house shade cloth as taught in this specification.
Figure 2:
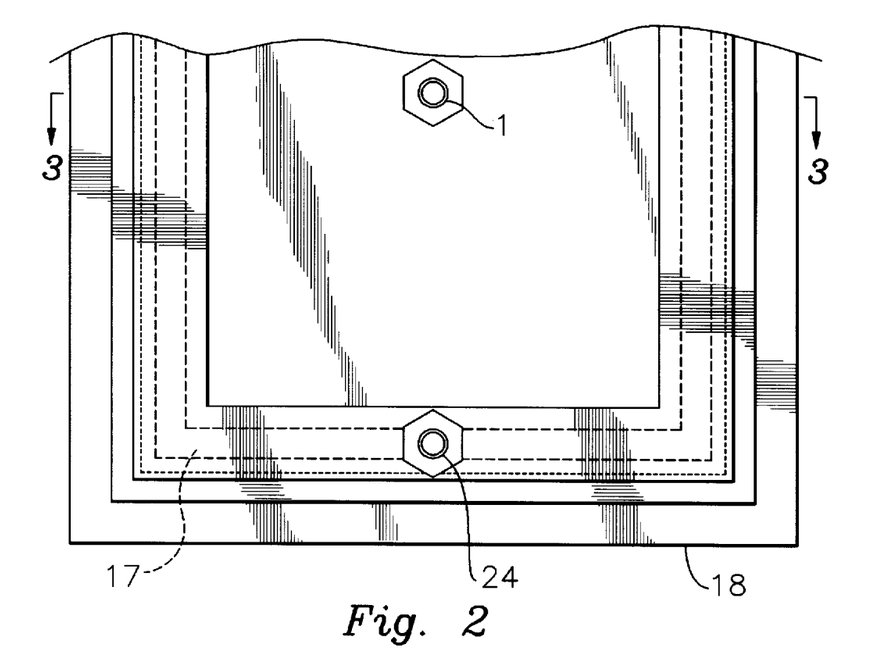
FIG. 2 is a top view of a section of the embodiment shown in FIG. 1.

One limitation which is not included in the prior art discussed above for this improvement can be shown by the following claim language:

As can best be seen by reference to FIG. 1 of the invention, a non-absorbent porous layer 2 is positioned between a top fiberglass resin absorbent layer 3 and a bottom fiberglass resin absorbent layer 4. This lay up 36 comprises layers 2, 4 and 5 communicating with a resin source (not shown, but this may be nothing more than a bucket containing resin) by way of tube 1. The tube 1 enters the top of the mold top 18. An entry means comprising an opening or passage 15 defined in the top absorbent layer 5 is located directly below where this opening 7 opens into the interior of the mold and this passage 15 is sufficiently large to allow the resin to reach the non-absorbing layer 2 at a desired rate. This passage 15 also allows the resin to reach the porous non-absorbing layer 2 without a sufficient amount of dissolved absorbing material to clog up the pores in the porous non-absorbing layer 2.

In the preferred embodiment, the non-absorbent layer 2 is a weave of non-absorbent fibers so that the spaces between the weaves provides channels. However, the use of other inflexible materials (plastics, glass, wood, etc) with channels defined through the inflexible material as well as along the plane defined by the wood could be used for similar purposes. Examples of solid cores, as opposed to woven cores, includes wood having grooves, channels or holes throughout the surface and foam having grooves, channels or holes throughout the surface; metal woven from fibers or having grooves, channels or holes throughout the surface. Examples of woven cores include plastic woven fibers or woven or knitted non-absorbent monofilament, greenhouse shading, etc. The channels 3 within the weaves work best when they are usually between 0.0075 inches and 0.60 inches.

In most applications, the top opening or passage 15 would be at least 25% of the diameter of the input opening 7 through which the resin enters the combination so described. Generally, the size of this passage may still continue to function with some success having a width of $\frac{1}{16}$th inch to 3 inches and a depth of $\frac{1}{16}$th to 3 inches with very small molds. The size and depth of the hole will vary with the diameter of the mold and the amount of pressure used to draw the resin into the mold.

The invention is further defined as comprising a resin source for supplying resin to at least three layers so defined. This resin source is typically defined in terms of a tube 1 supplying resin into a relatively air-tight mold. The resin is drawn into the mold when a vacuum is applied to the mold. Because of the unique features of this technique and lay-up, it may also be defined in terms of injecting resin under a pressure into a mold without a vacuum since the current invention may be practiced with the resin under pressure because of the benefits associated with the internal distribution medium with unrestricted access to the resin source. A drain would still be necessary to bleed air out of the mold as the resin fills the mold, but many advantages would be apparent such as a more careful control over the amount of resin injected into the system; having the lay-up cure under pressure; and, with large molds, such as ship hulls, pressure may be necessary since it may be impractical to put the entire mold under a vacuum.

The mold 6 has a top 18 which defines an input opening 7 substantially or approximately over the passage 15 in the absorbing layer. This passage 15 may be an opening in the reinforcing top layer 5 or it may be filled with non-absorbing mesh. In addition to the general parameters set forth above for the passage 15 defined by the top layer of absorbing material 5 (that it be at least 1/16th inch or 25% of the size of the opening through which the fiberglass resin enters the mold), the passage 15 can also be more narrowly defined as being at least 1/2 the size of the opening 7 or 1/3 of an inch in diameter to get the full benefit of the opening. For normal conditions, that is molds using standard resin, of normal size, temperature and pressure, these limitations are more suitable.

Figure 7:
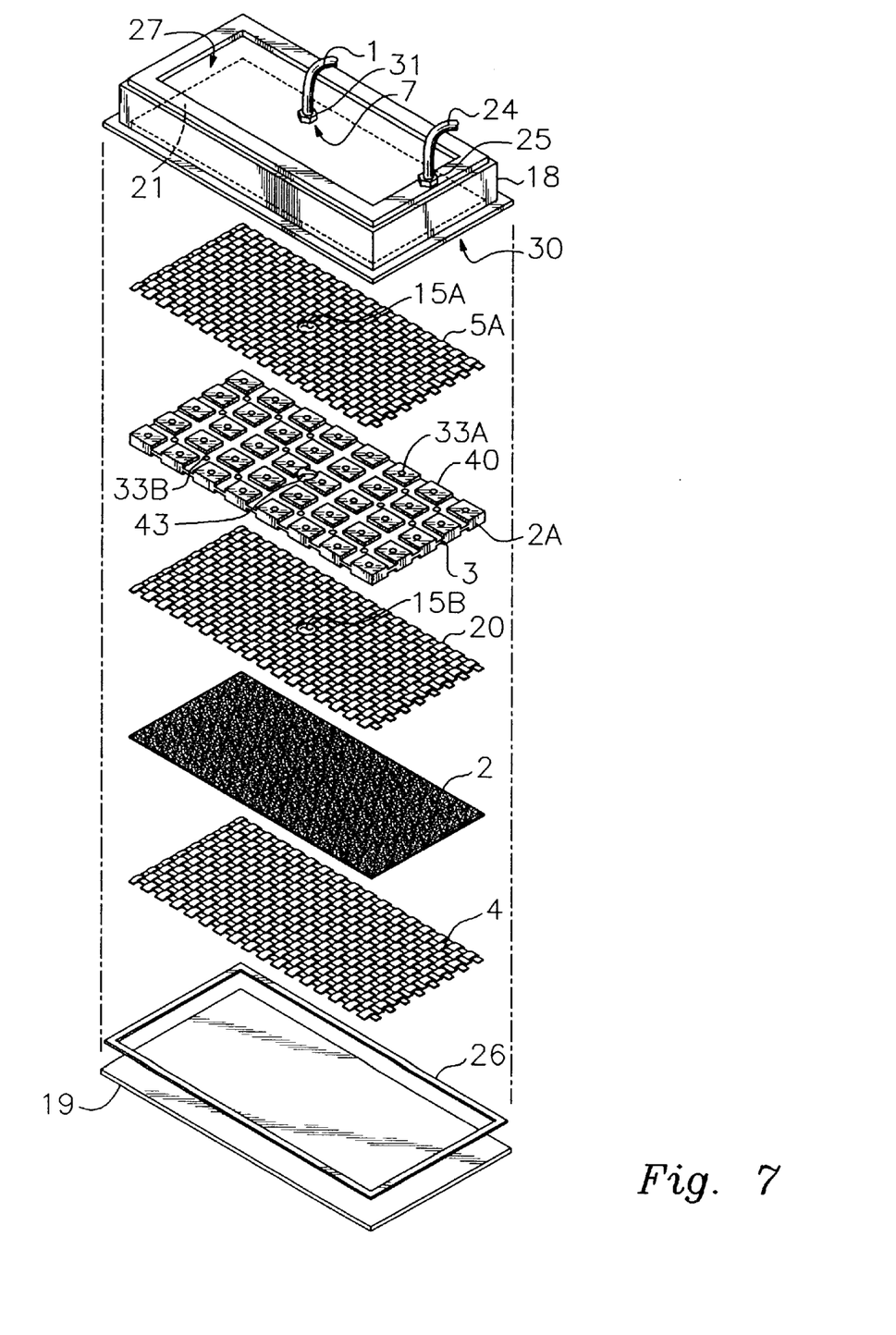
FIG. 7 shows an alternate embodiment exploded view using both woven and sheet goods such as plywood, or foam as the non-absorbent core with multiple absorbent reinforcing layers.

Similarly, there may be more than one passage 15 within the scope of the invention set forth herein where larger molds are utilized allowing for the size of the passages 15a–15b to be smaller as shown in FIG. 7. Though only two passages 15 are shown in FIG. 7, it is obvious that the number may vary considerably. For example, if a boat hull was constructed using this technique, there could be several hundred passages 15, all receiving resin under pressure or all subjected to a common vacuum.

Substantially smaller passages 15 in the absorbing top layer 5 might result in a portion of the absorbing material fouling the passage 15 and affecting resin flow throughout the non-absorbent layer 2. Also material from the top layer might flow into the non-absorbent layer 2 clogging the channels 3 in the non-absorbent layer 2. The function of the passage 15, is therefore seen to be (1) preventing the inflow of absorbing material into the non-absorbent layer 2 and (2) to prevent the expanding absorbing material from clogging the flow of resin through the passage 15.

The non-absorbent porous layer need only be substantially non-absorbing, since under some circumstances, the absorption of fiberglass could have a desirable effect as long as the overall function of the channels 3 was not affected. It is also clear from this discussion that having a weave of non-absorbing material having a series of passages, at least one of which was 1/16th inch would also function. The main limitation in the size of the passage 15 is that when the hole exceeds a certain size, the beneficial effect of the reinforcing top layer 5 is missing at the inlet site. By having multiple inlet openings 7 and multiple passages 15, this problem may be avoided.

The non-absorbing layer 2 may be defined as being substantially non-absorbing. Substantially non-absorbing simply means that it does not degrade or swell with the absorption of the fiberglass resin sufficiently to substantially impair the flow of resin through the channels defined by the non-absorbing layer 2. Substantially impair flow means that the flow would be so impaired so as to improperly fill the lay-up 36 to the requisite extent.

Other additional limitations which are important to more narrow versions of the invention includes the limitations on the diameter of the opening defined and sandwiching the core between layers of reinforcing fiber so that the core becomes a part of the mold. Various modifications of the core to make this construction stronger are also taught.

DETAILED DESCRIPTION OF THE PREFERRED EMBODIMENT

Figure 9:
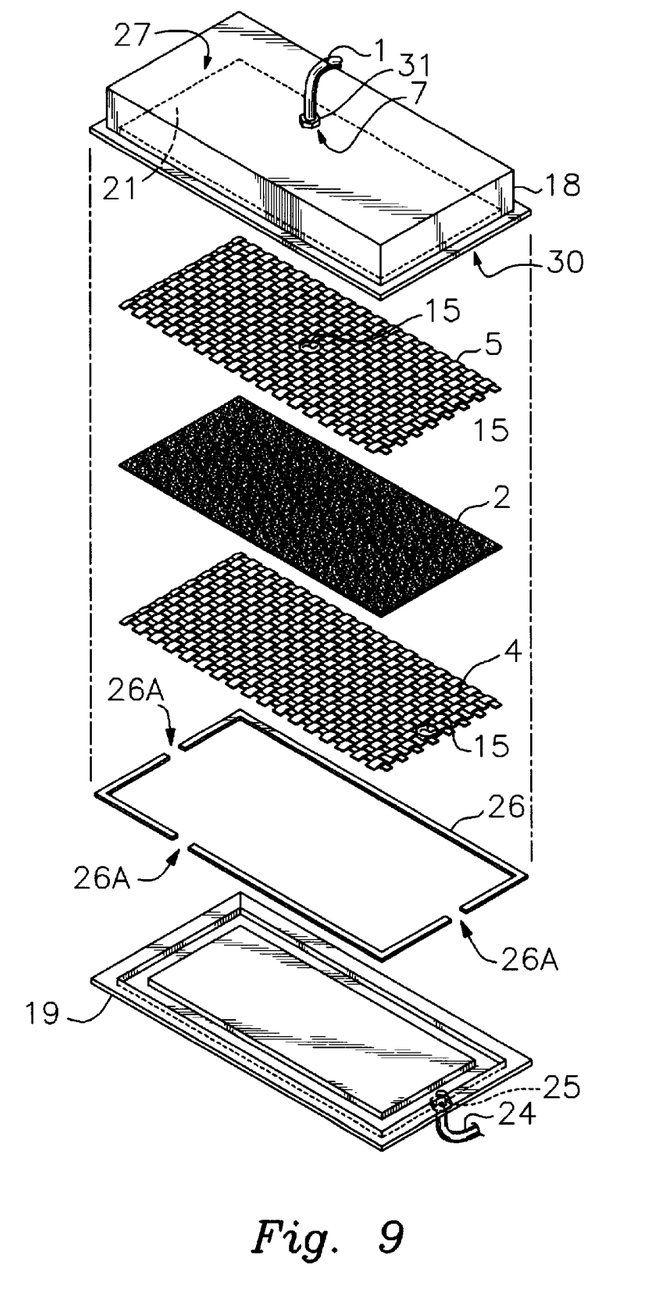
FIG. 9 shows an alternate embodiment exploded view using a bottom resin drain.

Referring to FIG. 1, the invention comprises a mold 6 having a mold top 18, a mold bottom 19 and a seal 26. Since this particular invention allows for both pressure resin impregnation and vacuum resin impregnation, the seal 26 may not be absolutely necessary in all embodiments. However, in most cases, even using pressure, a partial seal, such as is shown in FIG. 9 would be necessary to control the resin and prevent waste of resin.

A resin input tube 1 fits through a input opening 7. The opening is secured by a polypropylene low pressure tube fitting as is known in the art comprising a raised bolt 30 over which is a washer 32 which washer fits within and is compressed against the bolt 30 by a hollow nut 31 which receives the washer 32.

In order to let air escape in a pressure resin induction system where the mold is air tight or in order to draw a vacuum in a vacuum induced resin impregnation system, a resin output tube 24 is provided which fits into the interior of the mold through a output opening 25 which uses an identical sealing mechanism 30, 31, 32.

In order to have the vacuum spread evenly throughout the interior of the mold a vacuum perimeter 17 is provided along the perimeter of the mold top 18 so that the vacuum draws evenly throughout the entire mold.

The lay up 36 comprises a top layer of resin-absorbent material 5 which is typically referred to as reinforcing material. This top layer of resin-absorbent material 5 may also be described as a fiber reinforcement layer 5. The resin typically saturates and bonds the material which either absorbs or expands or dissolves partially in the presence of resin. The resin-absorbent material 5 comprise a non-absorbent passage 15 therein. The non-absorbent passage 15 is preferably below the top opening 7 so that the resin is introduced through the input tube 1 and passes directly to the passage 15. Below the top layer of absorbent material 5 is at least one substantially non-absorbent layer 2. At least a portion of the non-absorbent layer communicates with the passage 15. The non-absorbent layer 2 comprises a non-absorbing means for allowing the passage of resin throughout the non-absorbing layer 2 without substantial degradation of the non-absorbent layer 2 when in contact with resin and without substantial swelling. These properties of the non-absorbent layer 2 allow substantially unimpaired flow of the resin through channels 3 (which can be seen in FIG. 4) throughout the non-absorbing layer 2. It is, therefore, one purpose of the non-absorbent passage 15 to allow the resin to enter the channels 3 of the non-absorbent layer 2 without having first absorbed or carried a substantial amount of dissolved material from the resin-absorbent material 5. The combination of the channels 3 of the non-absorbent layer 2 and the passage 15 allow the unimpaired flow of resin. The flow is not so impaired as to improperly fill the lay up with resin and where the resin is absorbed in a quick enough rate so that the channels 3 are not sealed prior to distribution of resin throughout the lay-up 36.

As shown in FIG. 1 a bottom layer of resin-absorbent material 4 may be present. In this way, the non-absorbent layer 2 may be sandwiched between two absorbent layers. One of the purposes of accomplishing this is to produce a fully impregnated product without having to dispose of a resin distribution means. The resin distribution means in this case is the non-absorbent layer 2 and the passage 15 which allows for the passage of resin materials.

Figure 3:
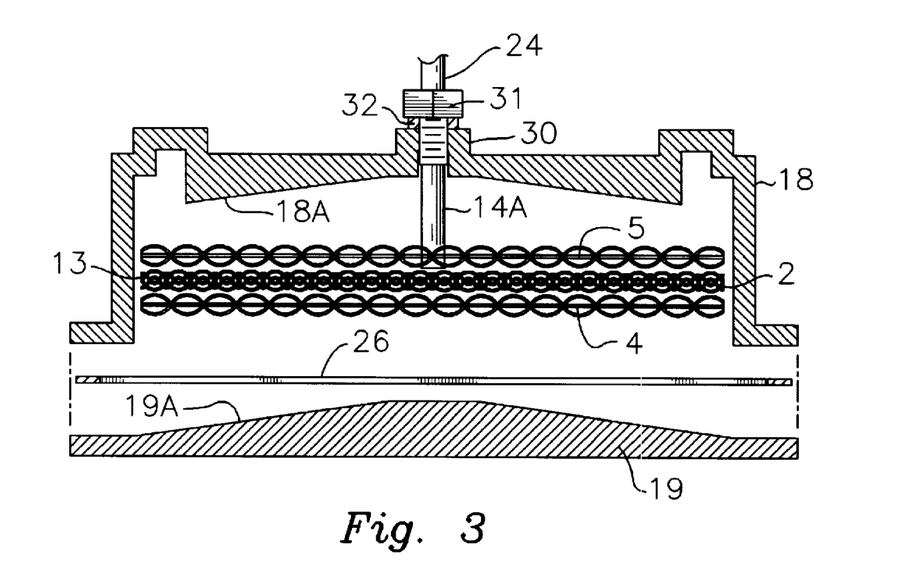
FIG. 3 is a cross sectional view of the embodiment shown in FIG. 2 through the 3—3 axis of FIG. 2.
Figure 8:
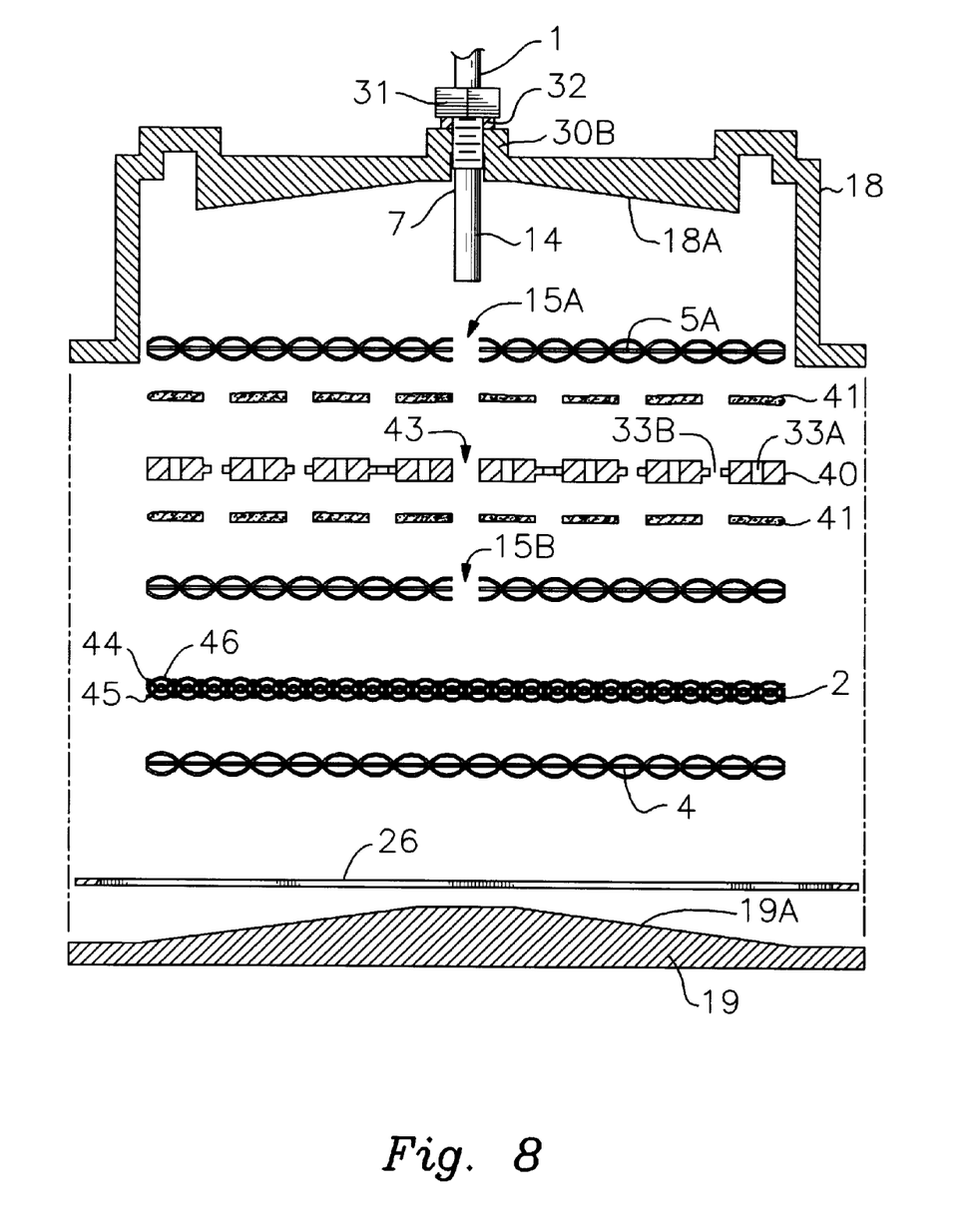
FIG. 8 shows an alternate cross sectional embodiment exploded view using sheet goods such as plywood, or foam as the non-absorbent core wherein the core is joined to the absorbing layers using layers of bonding material.

FIG. 3 is a cross section of the mold shown in FIG. 1. In the cross section shown in FIG. 3, the channels 3 can be seen to be comprised of holes defined by a weave of non-absorbent strands. The construction of weaves is well-known, but for the benefit of being substantially over descriptive FIG. 8 shows the numbered parts of a weave which include a cross-running strand 44, bottom cross running strand 45 and a middle strand 46 which would run in the opposite direction to the strand 44 and 45, although the weave could be any type of weave as long as it defines channels 3 through which the resin could flow. This is described more below in the discussion of FIGS. 11–13.

FIG. 8 also has added a opening tube 14 which is an optional feature. A tube 14 carries the resin through the top absorbing material 5 to the non-absorbing layer 2. The tube 14 is a part of the lay up when resin was introduced or would have to be made of a material to which resin would not bond so that it could be removed from the lay up after the resin is introduced.

Also shown in FIG. 3 is the interior 18a of the top mold and the interior of the mold bottom 19a which serves to provide a shape to the lay up. It is therefore another improvement of the invention to provide a mechanism for the distribution of resin throughout a lay up with a distribution means, the flexible layer of non-absorbing material 2, which can assume the shape of the interior surfaces 18a and 19a of a mold 6.

The non-absorbent layer 2 may comprise of a multitude of material which may either adapt in shape to the interior of the mold when flexible materials are used, or maintain its shape when inflexible materials are used. Some examples of non-absorbent layer materials include plastics, glass, wood, foam, woven or knitted filaments or monofilament, green house shading, beads, a weave of non-absorbent material having a series of channels such as knitted polyethylene, wood defining grooves or channels in holes in order to allow the resin to move throughout the mold, metal, ceramics and the like. Typically, it is important that the channels be at least 1/16 of an inch in order to allow adequate resin flow although depending on the viscosity of the resin and the amount of pressure put on the mold, the size of the channels may be varied. Typical examples of absorbing materials for the bottom layer of absorbing material 4 and the top layer of absorbing material 5 which are also known in the art as reinforcing layers, include carbon fiber, cloth and fiberglass which is also known as chop strand mat, veil mat, sterling paper, continuous strand mat, KEVLAR, and SPECTRA. These are generally known in the art.

Channels 3 defined by the weaves in the embodiment shown in FIG. 1 are typically greater than 0.0075 inches and are typically less than 0.6 inches. The passage 15 is typically at least 25% of the diameter of the input opening 7 in order to prevent excessive introduction of dissolved material from the top layer 5 of absorbing material. This passage 15 is usually between 1/16 of an inch and 3 inches in diameter although it may be larger. In addition, the passage 15 may either be an opening or may contain a non-absorbing material such as the material from the group described above when referring to the non-absorbent layer 2 as long as the passage resin is not unduly restricted thereby.

Typically, the non-absorbent passage has a depth of no more than 3 inches by is at least 1/64 of an inch.

In order to further prevent the restriction of resin a resin out non-absorbent passage 8 may be defined between the non-absorbent layer 2 and the vacuum perimeter 7 in the absorbent mat 5.

In FIG. 1, this outlet non-absorbent passage 8 appears to be directly below the vacuum tube 24, although this is not necessary.

FIG. 3 shows a resin out tube 14a which may go from the non-absorbent layer 2 to the resin out tube 24.

As is obvious, this tube 14a may go to any point in the vacuum perimeter 17.

Figure 4:
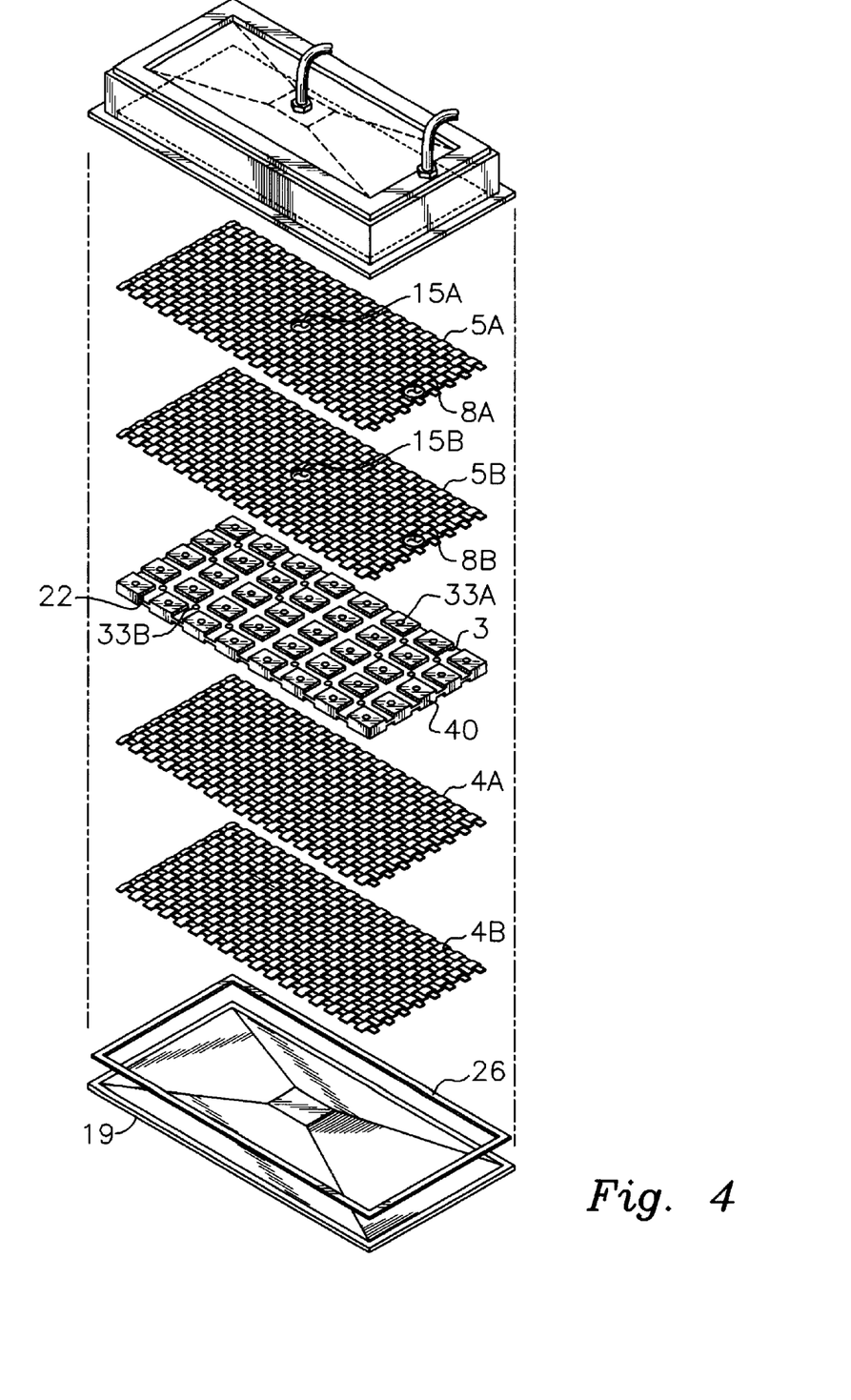
FIG. 4 shows an alternate embodiment exploded view using sheet goods such as plywood, or foam as the non-absorbent core. The sheets are slotted in both directions to allow the resin to flow the length and width of the sheet and upward saturating the top plies and holes are drilled through the slots to allow the resin to go to the bottom side of the sheet to saturate the lower plies. The individual blocks of core material may be in matrix with a flexible scrim material. The blocks may be any thickness and shape, as long as there is space between the blocks that allows the resin to flow the length and width of the core and upward saturating the upper plies and downward through the scrim material saturating the bottom plies.

As can be seen by reference to FIG. 4, there may be more than one layer of reinforcing material which is typically referred to herein as absorbing material. There may be a first top layer of absorbing material 5a and a second top layer of absorbing material 5b. As can be seen by reference to FIG. 4, each of the top absorbing layers, 5a and 5b would define top passage 15a and bottom passage 15b. In FIG. 4, grooves 3 are defined in a solid block of material. Holes 33 go through the center of the solid block of material in order to allow resin to pass.

Holes 33a are located outside of the grooves and holes 33b are within the grooves 3. Both the holes 33a and 33b and the grooves 3 comprise the channels referred to generally as 3 in this embodiment. The embodiment shown in FIG. 4 also shows the presence of a first bottom absorbent material 4a and a second bottom absorbent material 4b. It is obvious to one skilled in the art, that the number of layers may vary as long as all of the top layers 5a and 5b define non-absorbent passages 15a and 15b so that the resin may pass from the input opening 7 through to the non-absorbent layer 2.

Figure 5:
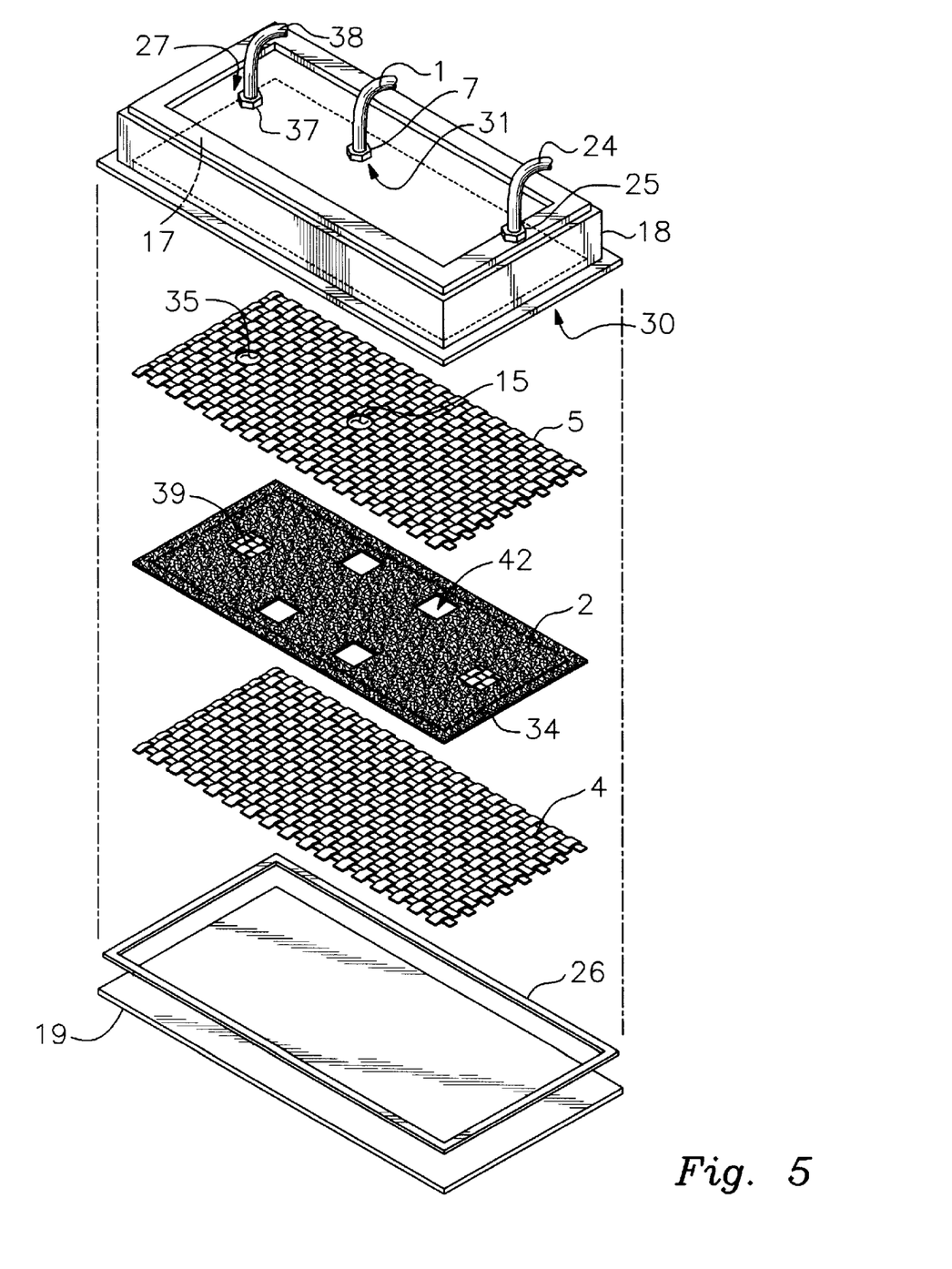
FIG. 5 shows an alternate embodiment exploded view using sheet goods such as plywood, or foam as the non-absorbent core wherein the core defines cut outs which may be filled with absorbent material and showing multiple input lines.

FIG. 5 shows yet another embodiment. Two improvements are shown in the embodiment shown in FIG. 5. One improvement is the presence of a second input tube 38 passing through a second opening 37 which is sealed with the same mechanism present for tubes 1 and 24. In larger molds it may be necessary to have multiple input openings and indeed may even be necessary to have multiple outlet openings where vacuum assisted process is being used.

Again, it is necessary that an opening 35 be provided for the passage of resin from tube 38 into the non-absorbent layer 2.

Figure 6:
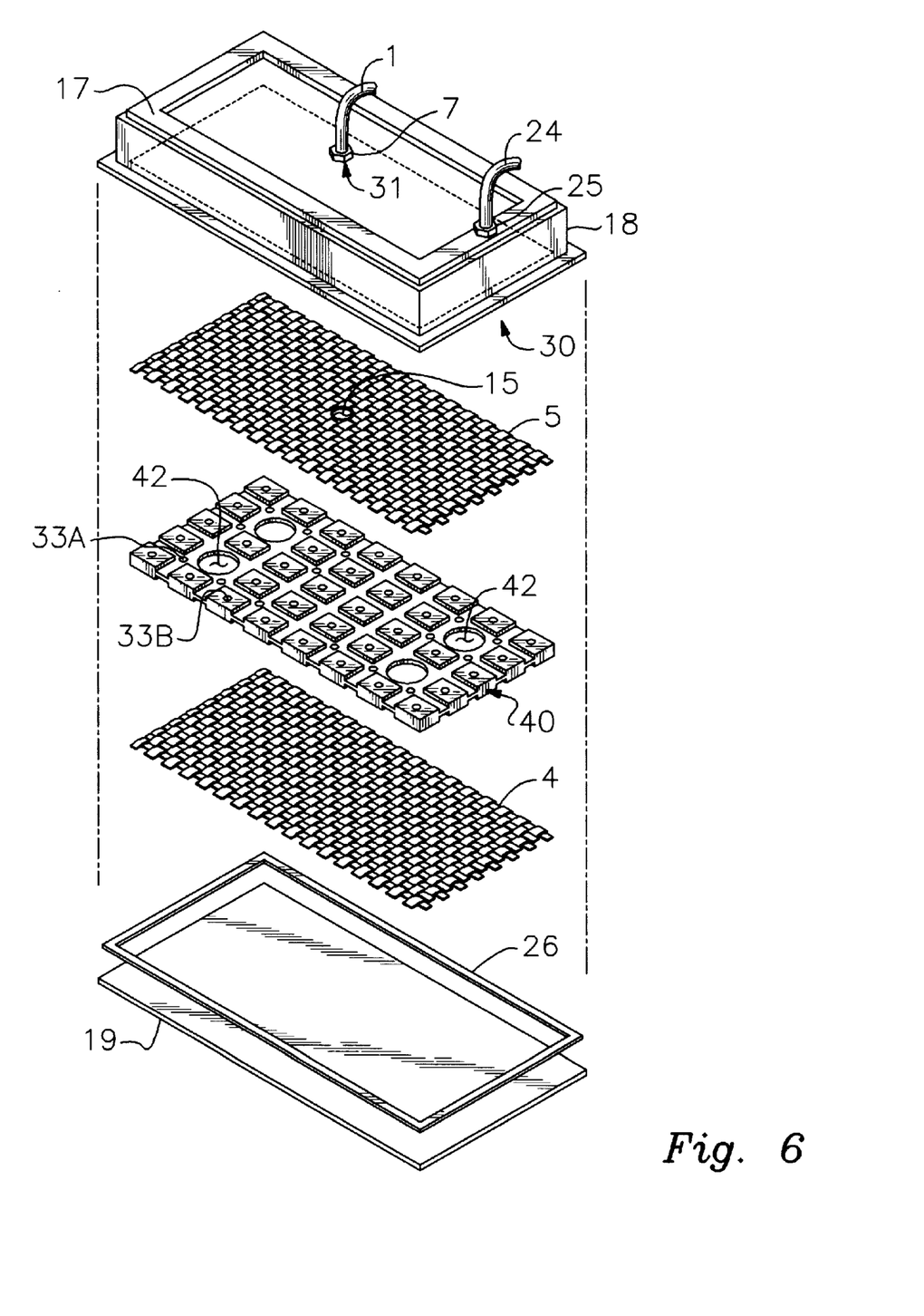
FIG. 6 shows an alternate embodiment exploded view using sheet goods such as plywood, or foam as the non-absorbent core wherein the core defines cut outs which may be filled with absorbent material.

Also shown in FIG. 5 are certain modifications to the non-absorbent layer 2 which are possible. At least one strand of absorbent material 34 may run through the non-absorbing matrix of the non-absorbing layer 2. The purpose of this strand 34 would be to reinforce the contact between the non-absorbent layer 2 and the fiberglass absorbent material 4 and 5. In this way, it may serve in order to reinforce the perimeter 21 of the non-absorbent layer 2 and in fact, the entire perimeter of the non-absorbent layer 2 may comprise absorbent material in order to reinforce this contact. Another method of practicing this technique is to have cut outs 42 in the non-absorbent layer 2 which would allow the top absorbent material 5 to actually contact the bottom absorbent material 4. Likewise, the cut outs 42, which may extend all the way to the perimeter of the non-absorbent layer 2 may be filled with resin-absorbent patches 39 as shown in FIG. 5. Patches 39, may be necessary where a thicker non-absorbent layer 2 is used or where non-absorbent layers 2 are built out of wood or other materials. FIG. 6 shows the presence of cut outs 42 in a wooden non-absorbent layer 2. It is obvious that the perimeter 21 of the non-absorbent layer 2 may be smaller than the perimeter of the absorbent layers 4 and 5 so that the sandwiching affect is accomplished without the use of absorbent strands 34 or cut outs 42. The cut outs 42 or absorbing strands 34 might still be necessary in order to secure the top absorbent material 5 to the bottom absorbent material 4 at the center of the non-absorbent layer 2.

FIG. 8 shows the existence of a tube from the input tube to the non-absorbent layer as is described in FIG. 3. FIG. 8 is a cross section of the mold shown in FIG. 7. This shows how in thicker molds, multiple non-absorbent layers 2 and 2a may be present as well as at least one middle absorbing mat 20.

FIG. 9 shows how the vacuum tube 24 and vacuum perimeter 17 may be located on the mold bottom 19 as opposed to the mold top 18. It would be obvious that the placement along the middle of the mold or any of the inlet or outlet tubes is taught by the disclosure set out herein.

The process may be described according to the following description:

A method of flowing resin from an inlet opening into a fiberglass lay up comprising at least one non absorbent core defining a channel for the passage of resin located below at least one top layer of fiber reinforcement layer defining an opening substantially below the inlet opening through the at least one top layer to the non-absorbing layer and beneath said at least one top layer comprising the steps of:

A) Flowing said resin through the opening defined by the fiber reinforcement layer, said hole of a diameter and length sufficient to prevent excessive restriction of the flow of the resin from the inlet opening through a path defined by said opening to said non-absorbent layer, (B) Flowing said resin along the channels defined by the non-absorbent layer through and along said non-absorbent layer, and (C) Flowing said liquid resin from said non absorbent layer channels into the into said fiber reinforcement layer.

The process further comprising a bottom fiber reinforcement layer below the non-absorbent layer and comprising the additional step of:

(D) Flowing said liquid resin from said non absorbent layer channels into said bottom fiber reinforcement layer.

The process of flowing may include the step of drawing a vacuum on the non-absorbent layer to draw resin into the non-absorbent layer.

The process of flowing may comprise the step of introducing the resin under pressure into the inlet opening.

Another way is to describe the preparation of the lay up.

(1) First, a suitable mold is prepared, having a top and a bottom and the top of the mold is removed.

(2) Then at least one layer of fiberglass matting is laid into the mold.

(3) At least one layer of non-absorbing material defining multiple channels through which the resin can pass through to both the bottom layer and a top layer to be added is placed above the bottom layer of fiberglass matting.

(4) Then a top mat is placed over the non-absorbing layer; and (5) Providing a hole through which resin may pass. The hole may be either in the top layer of matting or the bottom layer of matting and would run to the middle non-absorbing layer defining multiple channels. The hole would have to be of sufficient size to allow the resin to fill the entire mold given the pressure.

(6) Another step in the lay up would comprise flowing resin through the hole into the non-absorbing layer.

The limitations in connection with the preferred embodiment would be to have a core comprised of a weave of non-absorbing material defining a plurality of channels.

This step might further be described as flowing resin through an opening provided in the mold into a non-absorbing passage in either the top or bottom absorbing layer into the non-absorbing layer.

The step of flowing the resin may also include the step of drawing the resin into the mold by placing a vacuum within the mold or flowing the resin into the mold by applying pressure to the resin prior to its entry into the mold. An additional step of compressing the two molds together could also be added.

The flowing of the resin into the mold through the non-absorbing passage could be further defined as comprising a step of flowing the resin through an inlet substantially over the non-absorbent passage through the passage into the non-absorbing layer.

An additional step which could be added would be the step of curing the lay up while it was still under a vacuum.

Alternatively, a final step could be removing the vacuum and allowing the resin to cure.

Another step could be added which would be to add a layer of bonding material to at least one side of the non-absorbing layer to allow it to better bond to the top or bottom mat.

Yet another modification to the step of providing a hole would be the step of driving an internal resin tube from the opening in the mold through which resin enters through at least one of the absorbing mats into the non-absorbing layer.

Yet another step could be removing the internal resin tube prior to the resin curing which could be followed by the step of filling the opening left by removing the internal resin tube with resin as a mixture of resin and reinforcing matting.

The process for practicing the invention can be defined as the following steps:

1) Laying down at least one layer of fiberglass matting.
2) Adding at least one layer of non-absorbing material defining at least one channel through which the resin can pass to both the bottom layer and the top layer of absorbing material and then adding a top layer of absorbing material.

One embodiment of the invention would involve the following steps:

1) Providing a mold having a suitable shape.
2) Placing at least one sheet of fiberglass mat (such as three ounce mat) into the mold.
3) Placing at least one layer of non-absorbing means (such as PET recyclable plastic) onto the said at least one sheet;
4) Placing a second mat (again, an example would be three ounce mat) over the at least one PCP type plastic means wherein at least one sheet of said at least one three ounce mat further defines an opening of at least ⅛ inch in diameter or ⅛ the size of the fiberglass inlet providing resin to the matrix defined herein and further comprising a top vacuum means for enclosing the at least one vacuum in a seal and further comprising an inlet tube for supplying resin located substantially above the at least one opening of either ⅛ inch of diameter or ⅛ the size of said inlet opening and further providing at least one outlet tube for bringing a vacuum on the matrix between the at least one seal means and at least one mold.

The size of the passages 15 is governed by the number of input openings 7 and corresponding channels 3 and the internal volume of the mold to be infused with resin.

The mold 6 itself typically has two parts, a top 18, a bottom 19 wherein the top 18 has an internal surface 18a shaped to correspond to the shape of the top of the desired end product, and wherein the bottom has a bottom surface 19a shaped to correspond to the shape of the desired end product. The internal surfaces of the mold 18a and 19a ultimately contact the absorbing layers 5 and 4 in the preferred embodiment, at least when these layers are expanded through the absorption of fiberglass resin.

Figure 10:
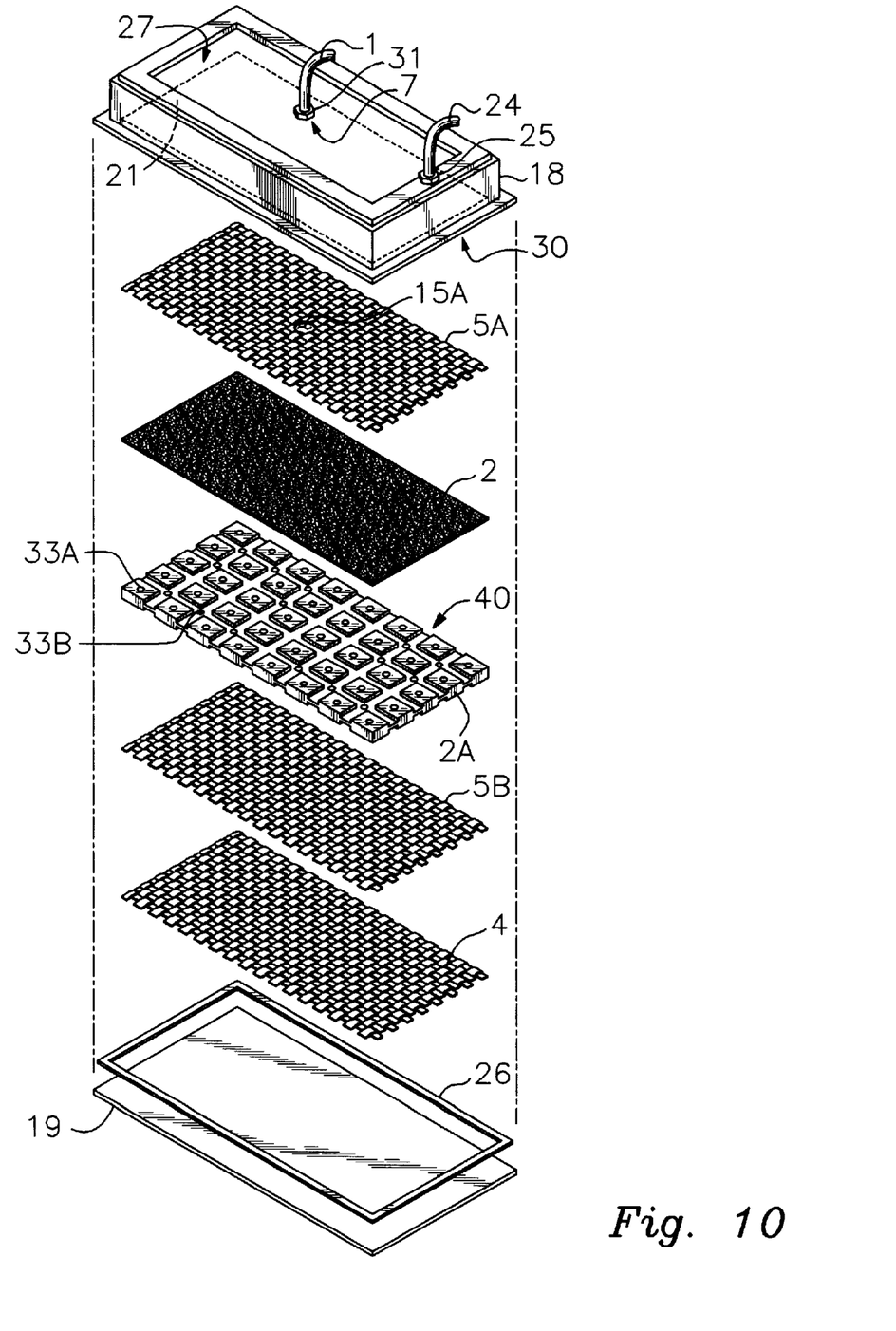
FIG. 10 shows an alternate embodiment exploded view using woven and sheet goods such as plywood, or foam as a common non-absorbent core.

The non-absorbent layer may consist of a weave of a non-absorbing material 2. Alternative embodiments as shown in FIG. 1 may use a solid core 40 as shown in FIG. 4 to accomplish different purposes. It may consist of more than one layer as shown in FIG. 10 where one layer may be woven 2 and another solid 40. The solid core 40 layers are typically a solid product with cut grooves as shown in FIG. 4. Holes 33 are also present to allow resin to pass to bottom layers 4.

The perforated solid core 40 may be made of flexible material as a part of the invention described herein.

Where a thicker mold is desired, such as is shown in FIG. 7, there may be a lay-up comprising a first top layer 5a comprising a first passage 15a, then a first core 40 shown here as a solid core which defines a core passage 43, then a middle absorbing matt 20 defining a second passage 15b continuous with the core passage 43 and the first passage 15a followed by a second non absorbing layer 2 shown here as a weave which also functions as a core followed by one or more bottom layers 4 of absorbing material. While two different types of cores are shown in FIG. 7, the cores may both be woven or both solid cores to accomplish different purposes. This may be repeated as many times as necessary in order to have a completed mold with two or more cores communicating by way of one or more passages 15. Similarly, one or more of several flow cores in such a series of layers may communicate with a separate inlet channel 35 as shown in FIG. 5. In this way bottom cores may be fed resin directly, as by running tubes 14 through the intermediary layers as shown by FIG. 8.

The lay up 36 is seen to be comprised of the top layer (comprised of one or more plies) 5, bottom layer 4 (comprised of one or more plies) and non-absorbing core 2 (comprised of one or more cores) and that this arrangement may be repeated as necessary.

This lay-up 36 is placed in the mold bottom 19. The mold top mold 18 is placed on top of the lay-up 36. Where a vacuum is used, the mold top 18 and bottom 19 are sealed around the perimeter with a vacuum seal 26 which is usually a gasket. This arrangement seals the two halves of the mold 18 and 19 together creating a partially sealed chamber between the two molds halves receiving resin through the input opening 7. A polypropylene fitting comprising a bolt 30 for receiving a hollow nut 31 and a washer 32 serves to seal the inlet tube 1 within the input opening 7. This arrangement may be varied in many ways as long as the passage of resin is allowed by the arrangement. The passage 15 must be located approximately below the input opening 7. For this reason, in many cases, the passage 15 may be cut after the mold top 18 is put in place through the input opening 7. Preferably, the lay-up will be laid precisely enough so that it may be cut in advance.

In the preferred embodiment, the bolt 30 may be defined by the mold top 18 for receiving the tube 1. A vacuum opening 25 is placed in the mold top 18 as shown in FIG. 1 or the mold bottom as shown in FIG. 9 which receives a vacuum tube 24 through which the vacuum is applied to the inside of the mold. A vacuum perimeter 17, which is essentially a groove around the internal surface of the mold, connects the approximate perimeter of the mold to the vacuum opening 25 to help distribute the vacuum applied to the mold. Where a pressure induced system is used, the seal 25 may define perforations 26a to allow resin out in various locations.

Where a vacuum is desired, a vacuum is pulled on the two molds via the vacuum tube 24. The seal 26 is usually flexible so that the vacuum compresses the two halves of the mold together against the lay-up 36. Mechanisms may be provided to minimize or maximize movement of molds together to allow for a better seal and to have the two inner faces 18a and 19a press more closely to the lay up. Examples are where the seal 26 is large enough to allow the molds to compress together or where the mold itself can flex to have the faces 18a and 19a move inward under the vacuums.

While under vacuum, fluid resin is allowed to enter the lay-up 36 by way of the resin inlet tube 1 emptying into the input opening 31. The fluid resin enters the non-absorbing layer 2 or 40 primarily through the passage 15 and continuously flows through the non-absorbing layer 2 outwardly to the lay-up non-absorbing layer perimeter 21. As the resin flows outward to the perimeter the resin also flows upward and saturates the upper plies 5 and flows downward saturating the lower plies 4 until the lay-up 36 is saturated.

The resin may be allowed to cure while still under vacuum. The vacuum is then turned off and the two molds pulled apart and the lay-up, no saturated with resin and hardened is removed from the mold.

Several variations of this process are possible.

1. The mold may be replaced with a silicone bag or a silicone bag may be used to seal the vacuum around the mold. This is particularly true where a female mold is used. In this case, there would be a bottom mold without a top. Looking at FIG. 3, this may be envisioned by having the mold top 18 be of a flexible sheet of silicone sealed on the perimeter and the bottom by seal 26 which would also be a silicone sheet. Since the silicone bag flexes, as it is placed over the mold bottom 19, it assumes the shape of the internal surface of the mold bottom 19a.

2. The mold may be replaced with a vacuum film which is identical structurally to the silicone bag. The vacuum perimeter 17 may be maintained by placing a coiled spring or piece of rope around the perimeter of the bag. In this case it may be desirable to use a peel ply layer between the vacuum film and the flow core lay-up to allow the vacuum to be evenly drawn. It is not necessary but may produce a more uniform finish on the inside of the part.

3. As shown in FIG. 8, a layer of bonding material 41 may be placed on the top and bottom of the core 40 to enhance bonding between the non-absorbing layer and the absorbing layer. Here the bonding material 41 is shown to be broken to keep open the openings 33B in the channels 3 between the raised squares 22 of the core 40.

As can be seen by one skilled in the art, the absorbing layers 4 and 5, also known as reinforcing layers may be fiberglass mat, carbon fiber, cloth or other materials capable of absorbing resin without departing from the process taught herein. Some examples are chopped strand matt (typically ½ to six ounce), veil matt, sterling paper, continuous strand matt, fiberglass, carbon fiber, KEVLAR, SPECTRA and PET.

It can also be seen from the description herein, the non-absorbent means may be replaced with any means which is not fiberglass absorbing, or which absorbs fiberglass at a sufficiently slow rate so as not to cause undue expansion so as to seal the channels 3 defined by the non-absorbing means 2 or 40. (Such as woven or knitted greenhouse shading-10%–95% or many other known matts or monofilament which do not absorb resin). Some examples of solid cores 40 are wood; foam, metal, ceramics, and plastic (having grooves or channels and holes). The plastic, foam or ceramic or wood defines grooves which supply fiberglass resin throughout the matrix.

In one embodiment, the non-absorbing means would further comprise at least one absorbing strand 34 of fiberglass absorbing material woven through the otherwise non-absorbing weave or layer 2 as shown in FIG. 5. This would allow for better bonding between the layers. This limited application of absorbing strands 34 would have to be sufficiently disbursed so that expansion of the absorbing material would not hinder the flow of the resin through the non-absorbing layer 2. Additionally, to enhance bonding, the non-absorbing layer could be provided with a weave of absorbing material 34 around at least a portion of the perimeter 21 (shown in FIG. 1 of the non-absorbing interior.

Similarly, patches 39 of absorbing material could be placed at strategic locations within the perimeter of the non-absorbing layer 2 as shown in FIG. 5. This, similarly, would enhance bonding between the three or more layers of the lay up (2,5 and 4. The key would be to have sufficient separation between the patches 39 so that the resin flow would not be disrupted to a degree that would leave the mold inadequately filled with resin.

Where wood or other less permeable layers are used, the lay up might include a layer of bonding material 41 between the non-absorbing core 2 and the fiberglass absorbing layers 5 and 4. This bonding material would allow for the fiberglass resin to bond to the wood or other core material.

In another embodiment, as shown in FIG. 5, the at least one non-absorbing means would further comprise a series of openings 42 of sufficient size to allow the top mat 5 and bottom mat 4 to substantially meet or otherwise provide a reduced distance between the top and bottom mat.

In this embodiment, the size of these holes would typically be at least ⅛ inch in diameter although the shape of the openings may be square, round, etc. Further, the non-absorbing layer may be a monofilament layer as shown in FIG. 5 or it may be a solid core 40 which has openings 42 as shown in FIG. 6 which may or may not be filled with absorbing material as shown in FIG. 5.

There are several improvements present when utilizing this invention.

First, since the non-absorbing member is embedded within the matrix, it does not need to be otherwise disposed of.

The non-absorbing member may have absorbing patches located throughout its surface in order to bind with the fiberglass on either side. Similarly, if wood is used as the non-absorbing portion of the matrix, it may be at least partially coated with a bonding material to allow it to better bond with the fiberglass.

Similarly, the non-absorbing matrix may define holes in it sufficient to allow the top mat to better join the bottom mat.

In the preferred embodiment this is not necessary since the monofilament non-absorbing layer 2 is thin enough so that there is an adequate penetration of resin from the top layer to the bottom layer to give strength to the unit. For some uses, for the sake of safety, it might be desirable to define holes 42 or fiberglass patches 39 as discussed above throughout the non-absorbing member for the purposes of enhancing the bond between the top fiberglass layer and the bottom fiberglass layer as defined in more detail herein. These patches 39 may also be described as having interspersed absorbing and non-absorbing portions of the substantially non-absorbing member using the definitions of function and structure discussed above.

A monofilament non-absorbing weave 2 as discussed herein is a weave of the type which is common to all weaves. Examples of weaves, which are known in the art of weaving, include linen weaves, twill weaves, weft fabric, warp fabric, rib fabric, interlocking weaves, tucked weaves, and the like. All these types of weaves would work since it is a common features of most, if not all, weaves, that spaces, shown as channels 3 in FIG. 3, are generated as a by-product of weaving threads.

Figure 11:
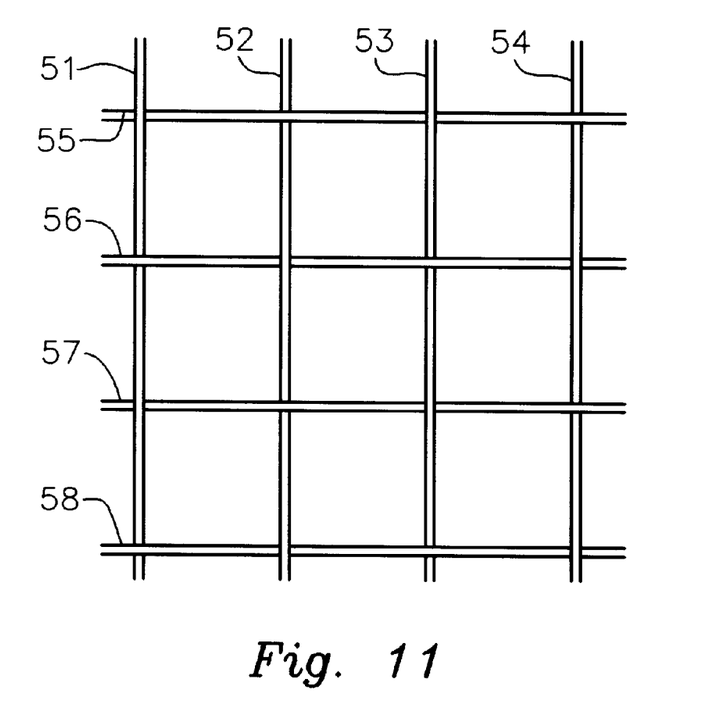
FIG. 11 shows a top view of a non-absorbent weave of the type which might be used to practice the invention.
Figure 12:
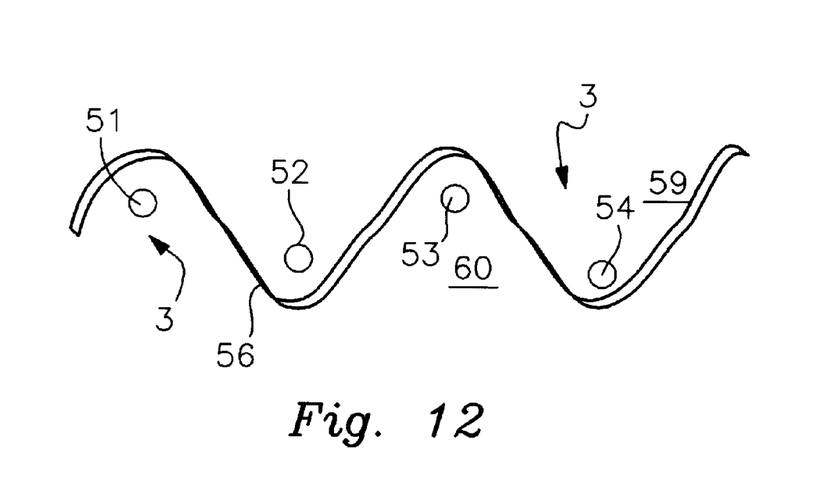
FIG. 12 shows a cross sectional view of the weave shown in FIG. 11.

FIG. 11 shows a view of a swath of linen-weave involving vertical threads 51 through 54 and horizontal threads 55–58. As shown in FIG. 12, a cross section shows that channels 3 are formed in the above areas 59 and below areas 60 from the intersection of the vertical thread 56 and horizontal threads 51–54. Channels 3 include these large areas as well as possible smaller size areas formed in the spaces that may exist between the horizontal and vertical threads.

Figure 13:
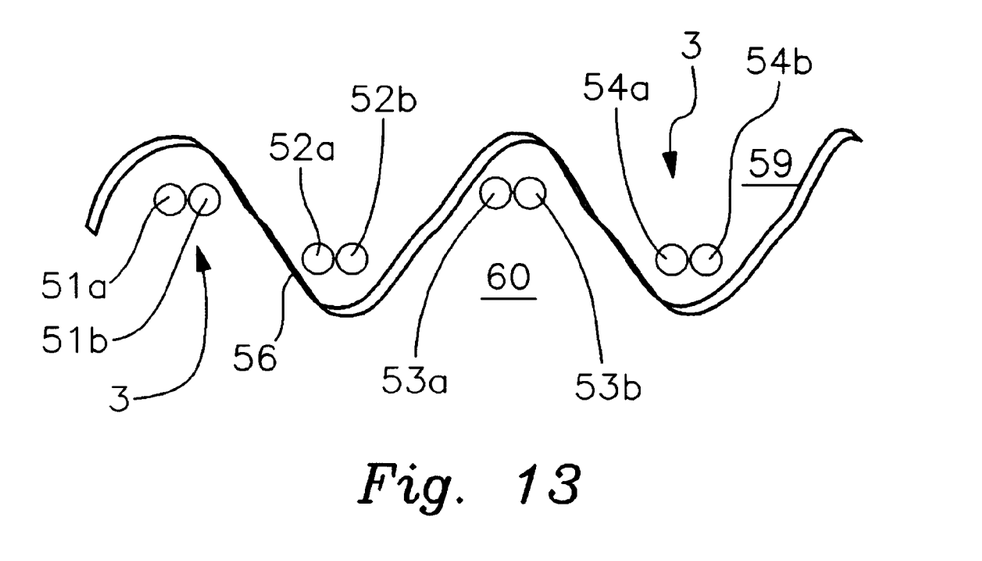
FIG. 13 shows an alternative thread design to that shown in FIG. 12.

FIG. 13 shows an example of another type of weave, here a twill weave. This twill weave has two vertical threads, broken into 51a and 51b through 54a and 54b. Additional space in the channels 3 may be defined by having these additional threads. This example can, of course, be applied to other types of weaves which would provide even more channel space.

The thickness of the weave and size of the channel 3 are increased in FIG. 13 by increasing the number of threads in a layer. Similarly, the thickness of the weave may be varied by increasing the size of the threads or by increasing the number of layers of weave.

The use of weaves provides for greater flexibility of the non-absorbing layer 2. In addition, the non-absorbing layer may be much thinner than the non-absorbing layers which are created with solid non-absorbing strata such as cores shown in some prior art.

Another embodiment of the invention would also incorporate an internal resin tube 14a in FIGS. 3 and 14 in FIG. 8 leading from the resin inlet 31 through the passage 15 to the non-absorbing layer 2. This would be particularly useful where thick lay ups having multiple top layers 5 and multiple non-absorbing layers 2 or cores 40 so that the resin must travel a substantial distance within the mold 6. This internal resin tube might ultimately become a part of the mold and hence may have the same qualities as the core non-absorbing layer as described above or may have walls made of resin absorbing material.

In some large-scale productions, it might be desirable to have this internal resin tube 14 have a tip which is sharpened so that it could cut the hole through to the non-absorbing layers 5. Similarly, the non-absorbing layer 2 could have at least one portion of it be fragile so that the fiberglass cut by the tube, could be pushed into the fragile non-absorbing portion.

It can be seen by reference to FIG. 8 that the two filaments may be a top cross running strand 44 and a bottom cross running strand 45 and a middle strand 46 which top and bottom cross running strands 44 and 45 run perpendicular to the middle strand 46 so that a space is formed between the top strand, the bottom strand and middle strand. These spaces between strands 44, 45 and 46 are the channels 3 through which the resin may flow throughout the non-absorbing layer to the entire lay-up.

The number of layers of fiberglass absorbing and non-absorbing weave or core materials may be varied as long as a sufficient amount of resin can get to each layer. Likewise, multiple layers of weave may be separated by multiple layers of non-absorbing channel providing means in the form of non-absorbing layers 2 or cores 40.

Likewise, there is no restriction on either the number of resin openings entering the mold nor the number of vacuum openings into the mold nor the number of openings for resin under pressure to leave the mold. All of these minor modifications would be made consistent with the size of the mold and the materials to be used, as well as temperature and viscosity questions.

What is claimed is:

1. A method of flowing resin from an inlet opening in an at least partially sealed mold into a lay-up, said lay-up comprising:
   (1) a weave of non-absorbent material defining a layer of material having a plurality of channels for passage of resin and having an upper surface defining an upper area and a lower surface defining a lower area, said non-absorbent layer located below a top resin absorbent reinforcement layer said top resin reinforcement layer having a bottom reinforcing area and wherein said non-absorbent layer is located above a bottom resin absorbent layer,
   (2) a passage extending from an inlet opening of said mold through the bottom reinforcing area of said top resin reinforcement layer said passage comprising a tube mounted therein, said non-absorbent layer having a cutout, wherein said top resin absorbent reinforcement layer is in contact with said bottom resin reinforcement layer within said cutout; said method comprising the following steps:
   (A) flowing said resin through said tube from the inlet opening to the non-absorbent layer;
   (B) flowing said resin from the non-absorbent material through the plurality of channels defined by the non-absorbent material to the top resin absorbent reinforcement layer and bottom resin absorbent reinforcement layer and flowing said resin through said cutout thereby joining and securing the top resin absorbent reinforcement layer to the bottom resin absorbent reinforcement layer.

2. The method of claim 1, wherein flowing said resin from an inlet opening further comprises drawing a vacuum on the mold for drawing resin into the channels of the non-absorbent layer.

3. The method of claim 1, wherein resin from an inlet opening further comprises introducing the resin under pressure into the inlet opening.

4. The method of claim 1, further comprising draining surplus resin from the lay-up.

5. The method of claim 1, wherein flowing said resin from the inlet opening further comprises placing a vacuum on a interior of the mold to draw the resin from the inlet opening into the mold.

6. The method of 1 wherein the mold defines an interior and further comprising compressing the lay-up against the mold interior.

7. The method of claim 1 further comprising the steps of forming said cutout in the non-absorbent layer and pushing the at least one top resin absorbent reinforcement into cutout so it is in contact with the bottom resin absorbent layer.

8. The method of claim 1 further comprising coating at least a portion of the at least one non-absorbent layer with a bonding material to allow the at least one-absorbent layer to bond with the at least one top resin absorbent reinforcement layer and the at least one bottom resin absorbent reinforcement layer.

9. A process for preparing fiber reinforcement coated with resin to form parts comprising the following steps:

laying down at least one bottom resin absorbent reinforcement layer of reinforcing material into a mold of desired shape;

covering the at least one bottom resin absorbent reinforcement layer with at least one non-absorbing layer of material comprising a weave of non-absorbent threads having channels and apertures therein through which the resin can pass;

covering the non-absorbing layer with a top resin absorbent reinforcement layer;

sealing the top resin absorbent reinforcement layer, the bottom resin absorbent reinforcement layer, and the non-absorbing layer within the mold;

providing a passage with a tube mounted therein extending from a mold resin inlet through said top resin absorbent reinforcement layer;

flowing resin from the mold inlet and through the passage to the non-absorbing layer, through the channels and apertures, and into the top resin absorbent reinforcement layer; and flowing said resin through said channels and apertures of said weave of said non-absorbent layer, thereby joining and securing the top resin absorbent reinforcement layer to the bottom resin absorbent layer through flow of resin within the channels and apertures of the non-absorbent layer.

10. The process of claim 9 wherein the weave is a flexible mesh.

11. The process of claim 10 wherein the reinforcement layers are flexible reinforcement layers.

12. A method of flowing resin from an inlet opening in an at least partially sealed mold into a lay-up, said lay-up comprising:

a weave of non-absorbent material defining a layer of material having a plurality of channels for passage of resin and having an upper surface defining an upper area and a lower surface defining a lower area, said non-absorbent layer located below a top resin absorbent reinforcement layer said top resin reinforcement layer having a bottom reinforcing area and wherein said non-absorbent layer is located above a bottom resin absorbent layer, (2) a passage extending from an inlet opening of said mold through the bottom reinforcing area of said top resin reinforcement layer said passage comprising a tube mounted therein, said non-absorbent layer having a resin absorbent strand woven through said layer, wherein said top resin absorbent reinforcement layer is in contact with said bottom resin reinforcement layer through said resin absorbent strand; said method comprising the following steps:

(A) flowing said resin through said tube from the inlet opening to the non-absorbent layer;

(B) flowing said resin from the non-absorbent material through the plurality of channels defined by the non-absorbent material to the top resin absorbent reinforcement layer and bottom resin absorbent reinforcement layer and flowing said resin through said resin absorbent strand thereby joining and securing the top resin absorbent reinforcement layer to the bottom resin absorbent reinforcement layer.

13. The method of claim 12, wherein said resin absorbent strand is woven through a perimeter of the non-absorbing layer.

14. A method of flowing resin from an inlet opening in an at least partially sealed mold into a lay-up, said lay-up comprising:

(1) a weave of non-absorbent material defining a layer of material having a plurality of channels for passage of resin and having an upper surface defining an upper area and a lower surface defining a lower area, said non-absorbent layer located below a top resin absorbent reinforcement layer said top resin reinforcement layer having a bottom reinforcing area and wherein said non-absorbent layer is located above a bottom resin absorbent layer, (2) a passage extending from an inlet opening of said mold through the bottom reinforcing area of said top resin reinforcement layer said passage comprising a tube mounted therein, said non-absorbent layer having a cutout, wherein said cutout further comprising a patch of resin absorbing material for binding said top and bottom resin absorbent reinforcement layers, said method comprising the following steps:

(A) flowing said resin through said tube from the inlet opening to the non-absorbent layer;

(B) flowing said resin from the non-absorbent material through the plurality of channels defined by the non-absorbent material to the top resin absorbent reinforcement layer and the bottom resin absorbent reinforcement layer and flowing said resin through said patch for binding said top resin absorbent layer and said bottom resin absorbent layer.

15. The process of claim 9, wherein said weave of non-absorbent material is selected from the group consisting of linen weaves, twill weaves, weft fabric, warp fabric, rib fabric, interlocking weaves, tucked weaves, plastic woven fibers, woven or knitted non-absorbent monofilament, and greenhouse shading, and combinations thereof.

16. The process of claim 9, wherein increasing a quantity of threads in a layer increases channel size of said weave.

17. The process claim 9, wherein spacing between woven non-absorbent fiber provides channels for resin flow.

18. The process of claim 16, wherein said channel width is from about 0.0075 inches to about 0.60 inches.

19. The process of claim 1, wherein said passage is about 25% of the diameter of said inlet opening.

* * * * *